US006586553B1

(12) United States Patent
Mühlfeld et al.

(10) Patent No.: US 6,586,553 B1
(45) Date of Patent: Jul. 1, 2003

(54) POLYURETHANE MOLDING MASS THAT CAN BE PROCESSED THERMOPLASTICALLY

(75) Inventors: Horst Mühlfeld, Grasellenbach (DE); Silke Wagener, Landau (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/539,647

(22) Filed: Mar. 30, 2000

(30) Foreign Application Priority Data

Apr. 9, 1999 (DE) .......................... 199 15 932

(51) Int. Cl.⁷ .................. C08G 18/32; C08G 18/65; C08G 18/66; C08G 18/44; C08G 18/48
(52) U.S. Cl. .................. 528/76; 528/80; 528/83; 528/84; 528/85; 528/905
(58) Field of Search .................. 528/76, 80, 83, 528/84, 85, 905

(56) References Cited

U.S. PATENT DOCUMENTS

| | | | | |
|---|---|---|---|---|
| 4,111,913 A | * | 9/1978 | Schuhmacher et al. | 528/85 |
| 4,316,457 A | * | 2/1982 | Liegeois | 128/156 |
| 4,500,671 A | * | 2/1985 | Goyert et al. | 524/494 |
| 5,496,909 A | * | 3/1996 | Muhlfeld et al. | 528/76 |
| 6,166,135 A | * | 12/2000 | Kaufhold et al. | 525/123 |
| 2003/0013792 A1 | * | 1/2003 | Muhlfeld et al. | 524/394 |

FOREIGN PATENT DOCUMENTS

| | | |
|---|---|---|
| DE | 26 58 136 | 6/1978 |
| DE | 42 03 307 | 12/1992 |

* cited by examiner

Primary Examiner—Rabon Sergent
(74) Attorney, Agent, or Firm—Kenyon & Kenyon

(57) ABSTRACT

A polyurethane molding mass that can be processed thermoplastically, that is free of by-products capable of migration, and demonstrates a high level of light-fastness. A polyurethane molding mass that can be processed thermoplastically, that is free of cyclic oligourethanes capable of migration, and demonstrates a high level of light-fastness, can be obtained, according to the invention, by reaction of one or more aliphatic polyols with a molecular weight of 450 to 4000 g/mol and an OH number of 20 to 235, selected from the group of polyadipates, polycaprolactones, polycarbonates, polytetrahydrofurane, and corresponding copolymers or mixtures of them, with 1,6-hexamethylene diisocyanate and a chain lengthening agent selected from the group of 1,5-pentane diol, 1,6-hexane diol, and 1,4-cyclohexane diol, with an equivalence ratio of the 1,6-hexamethylene diisocyanate to the polyol of 1.5:1 to 14.0:1, where the NCO characteristic number, formed from the quotient of the equivalence ratios of isocyanate groups to the sum of the hydroxyl groups of polyol and chain lengthening agent, multiplied by 100, lies in the range of 96 to 105.

12 Claims, No Drawings

POLYURETHANE MOLDING MASS THAT CAN BE PROCESSED THERMOPLASTICALLY

BACKGROUND OF THE INVENTION

1. Field of the Invention

The invention relates to a polyurethane molding mass that can be processed thermoplastically, that is free of by-products capable of migration, and demonstrates a high level of light-fatness.

2. Description of Related Art

Polyurethane molding masses that can be processed thermoplastically are known from documents German Patent 26 58 136 and German Patent 42 03 307, made from mixtures of various aliphatic polyols and 1,6-hexamethylene diisocyanate with chain lengthening agents such as 1,4-butane diol. The polyurethane molding masses described there can be used, in particular, for the production of foods packaging, but also for the production of films for decorative purposes. While the polyurethane molding masses defined in the patents are suitable for thermoplastic processing methods with regard to their melt properties, as well as suitable for the aforementioned uses with regard to their strength level, the content of cyclic oligourethanes in the polyurethane molding masses is disadvantageous. Optical changes, for example on the surface of films, can be caused by migration of these cyclooligourethanes. For most uses, this is highly undesirable. Therefore the presence of substances capable of migration excludes any use for foods packaging and as a molding element for hygiene or medical use.

Use of the known polyurethane molding masses in the motor vehicle interior sector is no longer possible, since the automotive industry is increasingly demanding materials with a lesser tendency towards developing a white haze.

The migration products also exclude any use as foods packaging and as a molding element for hygiene or medical use.

SUMMARY OF THE INVENTION

It is an object of the invention to provide a polyurethane molding mass that can be processed thermoplastically, that is free of by-products capable of migration. It is a further object of the invention to provide for uses of such a molding mass.

These and other objects are accomplished, according to the invention, by a polyurethane molding mass that can be processed thermoplastically, that is free of cyclic oligourethanes capable of migration, and demonstrates a high level of light-fastness, that can be obtained by reaction of one or more aliphatic polyols with a molecular weight of 450 to 4000 g/mol and an OH number of 20 to 235, selected from the group of polyadipates, polycaprolactones, polycarbonates, polytetrahydrofurane, and corresponding copolymers or mixtures of them, with 1,6-hexamethylene diisocyanate and a chain lengthening agent selected from the group of 1,5-pentane diol, 1,6-hexane diol, and 1,4-cyclohexane diol, with an equivalence ratio of the 1,6-hexamethylene diisocyanate to the polyol of 1.5:1 to 14.0:1, where the NCO characteristic number, formed from the quotient of the equivalence ratios of isocyanate groups to the sum of the hydroxyl groups of polyol and chain lengthening agent, multiplied by 100, lies in the range of 96 to 105. In the sense of this invention, a polyurethane molding mass that can be processed thermoplastically and is free of by-products capable of migration is understood to be one in which no oligourethanes can be detected on the surface of samples, under the conditions indicated below.

DETAILED DESCRIPTION OF THE INVENTION

In the reaction of polyether and polyester polyols with 1,6-hexamethylene diisocyanate and the chain lengthening agent 1,4-butane diol that is preferably used, cyclic oligourethanes are formed, particularly cyclic dimers and cyclic tetramers of 1,4-butane diol and 1,6-hexamethylene diisocyanate. These compounds, with a low molecular weight, possess a marked capacity for migration and can cause the formation of a white haze on the surface of polyurethane molding masses, among other things.

The cyclic dimer is soluble in water and can be sublimated, the cyclic tetramer is crystalline, insoluble in water, and cannot be sublimated. Both compounds are capable of migration and form a white haze on the surface of the polyurethane molding masses. Polyurethanes with oligomer components that are capable of migration and can be sublimated, some of which are also soluble in water, are therefore unsuitable for many applications. Use in the foods, hygiene, and medical sector must be precluded, among other things because some of the migration products are easily soluble in aqueous solvents. Use of polyurethanes, which are of high quality with regard to their mechanical properties, as surface paneling in the motor vehicle interior sector, for example, is not possible because of the formation of a white haze on the surface.

Use in the foods, hygiene, and medical sector must be precluded, among other things because some of the migration products are easily soluble in aqueous solvents.

Surprisingly, it was found that in the production of aliphatic polyurethane molding masses based on polyether and/or polyester polyol, by reaction of 1,6-hexamethylene diisocyanate and a chain lengthening agent selected from the group 1,5-pentane diol, 1,6-hexane diol, and 1,4-cyclohexane diol, no cyclic oligourethanes that can be detected in the specially developed white haze test are formed.

The formation of the white haze by migration of the oligourethanes is a continuous process. The white haze might only become clearly visible after weeks or months. During storage in a steam-saturated atmosphere, the migration process is significantly accelerated, so that identification and characterization are possible after only two days of storage under the aforementioned conditions, using a highly sensitive detection method such as FTIR spectroscopy studies of the sample surface.

The formation of a white haze is tested after exposing the samples to a steam-saturated atmosphere for 48 hours, at 48° C. and 80° C., using Fourier transformation infrared spectroscopy (FTIR). The diurethanes and tetraurethanes demonstrate a characteristic band combination in the wavelength range of 1800 $cm^{-1}$ to 1400 $cm^{-1}$, which is not overlayered by the specific bands of the polyurethane matrix.

As the examples below show, the polyurethane molding masses that can be obtained according to the present invention do not demonstrate any mechanical or processing technology disadvantages as compared with the known aliphatic polyurethane masses that can be processed thermoplastically. The crystallization process for an efficient processing method is also not influenced significantly, particularly if 1,6-hexane diol is used as the chain lengthening agent. Furthermore, they demonstrate the following advantages:

no cyclic oligourethanes that can be detected according to the processes indicated, good processability in thermoplastic processing methods such as injection molding, melt extrusion, melt spin, sintering, or melt glue processes, good crystallization behavior, particularly rapid recrystallization for an efficient processing method in the aforementioned processes, a high level of tensile strength, tear resistance, and tear propagation resistance, good elastic properties, a high level of light-fastness, i.e. no yellowing due to the effects of light.

The polyurethane molding masses according to the invention can also be mixed with known fillers and additives, flame retardants and agents to prevent aging, as well as processing aids and pigments, during their production or before being processed further.

The invention will be explained in greater detail using the following examples.

EXAMPLE 1

Composition of the mixture

| | |
|---|---|
| 100.00 parts by weight | polycaprolactone with a molecular weight of 2000 and an OH number of 56.0, |
| 15.57 parts by weight | 1,6-hexane diol, |
| 30.00 parts by weight | 1,6-hexamethylene diisocyanate. |

Production Method

Production takes place using the single-stage method. Polycaprolactone, 1,6-hexane diol, and 1,6-hexamethylene diisocyanate are heated to 80° C. in a reactor, while stirring. Due to the exothermic reaction, the temperature rises to 180° C. within approximately 12 minutes. At this temperature, the product is poured onto a polytetrafluoroethylene film. After about 8 hours, the plate that has formed can be processed to yield granulate.

The polyurethane molding mass demonstrates the following melt properties:

Melting point: 160° C.,

Melt index according to DIN ISO 1133 at 2.16 kg stress, measured at 170° C.: 17 g/10 min, measured at 200° C.: 60 g/10 min, measured at 220° C.: 144 g/10 min.

A plate with a thickness of 1 mm, produced using the pressing method, has the following properties:

Tensile strength: 28.2 MPa,

Elongation to rupture: 770%,

Tear propagation resistance: 66.3 N/mm.

Testing for products in the polyurethane molding mass that are capable of migration:

Storage for 48 hours in a steam-saturated atmosphere at 48° C., no bands specific to cyclooligourethane that can be detected by FTIR spectroscopy Storage for 48 hours in a steam-saturated atmosphere at 80° C., no bands specific to cyclooligourethane that can be detected by FTIR spectroscopy

EXAMPLE 2

Composition of the mixture

| | |
|---|---|
| 100.00 parts by weight | polyester based on adipinic acid and hexane diol as well as neopentyl glycol with a molecular weight of 2000 and an OH number of 56.0, |
| 11.12 parts by weight | 1,6-hexane diol, |
| 24.00 parts by weight | 1,6-hexamethylene diisocyanate. |

Production takes place analogous to Example 1.

The polyurethane molding mass demonstrates the following melt properties:

Melting point: 165° C.,

Melt index according to DIN ISO 1133 at 2.16 kg stress, measured at 170° C.: 3.5 g/10 min, measured at 200° C.: 21.3 g/10 min, measured at 220° C.: 70.9 g/10 min.

A plate with a thickness of 1 mm, produced using the pressing method, has the following properties:

Tensile strength: 34.1 MPa,

Elongation to rupture: 756%,

Tear propagation resistance: 70.8 N/mm.

Testing for products in the polyurethane molding mass that are capable of migration:

Storage for 48 hours in a steam-saturated atmosphere at 48° C., no bands specific to cyclooligourethane that can be detected by FTIR spectroscopy Storage for 48 hours in a steam-saturated atmosphere at 80° C., no bands specific to cyclooligourethane that can be detected by FTIR spectroscopy

EXAMPLE 3

Composition of the mixture

| | |
|---|---|
| 100.00 parts by weight | polycarbonate diol with a molecular weight of 2000 and an OH number of 56.0, |
| 13.73 parts by weight | 1,5-pentane diol, |
| 30.00 parts by weight | 1,6-hexamethylene diisocyanate. |

Production takes place analogous to Example 1.

The polyurethane molding mass demonstrates the following melt properties:

Melting point: 140° C.,

Melt index according to DIN ISO 1133 at 2.16 kg stress, measured at 170° C.: 12 g/10 min, measured at 200° C.: 78 g/10 min, measured at 220° C.: 126 g/10 min.

A plate with a thickness of 1 mm, produced using the pressing method, has the following properties:

Tensile strength: 29.4 MPa,

Elongation to rupture: 695%,

Tear propagation resistance: 60.5 N/mm.

Testing for products in the polyurethane molding mass that are capable of migration:

Storage for 48 hours in a steam-saturated atmosphere at 48° C., no bands specific to cyclooligourethane that can be detected by FTIR spectroscopy Storage for 48 hours in a steam-saturated atmosphere at 80° C., no bands specific to cyclooligourethane that can be detected by FTIR spectroscopy

EXAMPLE 4

Composition of the mixture

| | |
|---|---|
| 100.00 parts by weight | polycarbonate diol with a molecular weight of 2000 and an OH number of 56.0, |
| 11.10 parts by weight | 1,4-cyclohexane diol, |
| 24.00 parts by weight | 1,6-hexamethylene diisocyanate. |

Production takes place analogous to Example 1.

The polyurethane molding mass demonstrates the following melt properties:

Melting point: 155° C.,

Melt index according to DIN ISO 1133 at 2.16 kg stress,
measured at 170° C.: 4.8 g/10 min,
measured at 200° C.: 39 g/10 min,
measured at 220° C.: 92 g/10 min.

A plate with a thickness of 1 mm, produced using the pressing method, has the following properties:

Tensile strength: 24.2 MPa,

Elongation to rupture: 776%,

Tear propagation resistance: 37.7 N/mm.

Testing for products in the polyurethane molding mass that are capable of migration:

Storage for 48 hours in a steam-saturated atmosphere at 48° C., no bands specific to cyclooligourethane that can be detected by FTIR spectroscopy Storage for 48 hours in a steam-saturated atmosphere at 80° C., no bands specific to cyclooligourethane that can be detected by FTIR spectroscopy

EXAMPLE 5

Composition of the mixture 50.00 parts by weight polycarbonate diol with a molecular weight of 2000 and an OH number of 56.0, 50.00 parts by weight polyester based on adipinic acid and butane diol with a molecular weight of 2000 and an OH number of 56.0, 15.57 parts by weight 1,6-hexane diol, 30.00 parts by weight 1,6-hexamethylene diisocyanate.

Production takes place analogous to Example 1.

The polyurethane molding mass demonstrates the following melt properties:

Melting point: 165° C.,

Melt index according to DIN ISO 1133 at 2.16 kg stress,
measured at 170° C.: 4.1 g/10 min,
measured at 200° C.: 13 g/10 min,
measured at 220° C.: 46 g/10 min.

A plate with a thickness of 1 mm, produced using the pressing method, has the following properties:

Tensile strength: 48.2 MPa,

Elongation to rupture: 713%,

Tear propagation resistance: 96 N/mm.

Testing for products in the polyurethane molding mass that are capable of migration:

Storage for 48 hours in a steam-saturated atmosphere at 48° C., no bands specific to cyclooligourethane that can be detected by FTIR spectroscopy Storage for 48 hours in a steam-saturated atmosphere at 80° C., no bands specific to cyclooligourethane that can be detected by FTIR spectroscopy

What is claimed is:

1. A thermoplastically processable polyurethane molding mass, free of cyclic oligourethanes capable of migration, which is the reaction product of: one or more aliphatic polyols having a molecular weight of 450 to 4000 g/mol and an OH number of 20 to 235, selected from the group consisting of polycarbonates, polytetrahydrofurane, and copolymers thereof and mixtures thereof, mixtures of a polycarbonate or a polytetrahydrofurane with a polyadipate or a poly polycaprolactone; and a mixture of: (1) polycaprolactones and copolymers thereof with polycarbonates, polytetrahydrofurans, polypropyleneglycol and polyethylene glycol; with (2) a member of the group consisting of polycarbonates, polytetrahydrofurans, polypropyleneglycol and polyethyleneglycol, with 1,6-hexamethylene diisocyanate and a chain lengthening agent selected from the group consisting of 1,5-pentane diol, 1,6-hexane diol, and 1,4-cyclohexane diol, wherein the equivalence ratio of the 1,6-hexamethylene diisocyanate to the polyol is 1.5:1 to 14.0:1, and wherein the NCO characteristic number, formed from the quotient of the equivalence ratios of isocyanate groups to the sum of the hydroxyl groups of polyol and chain lengthening agent, multiplied by 100, lies in a range of 96 to 105, and wherein the polyol polycaprolactone is not used in combination with 1,6-hexanediol.

2. The thermoplastically processable polyurethane molding mass of claim 1, wherein the aliphatic polyols are selected from the group consisting of:
    (a) polycarbonates;
    (b) polytetrahydrofurans;
    (c) combinations of a polycarbonate or polytetrahydrofurane with either a polyadipate or polycaprolactone;
    (d) a mixture of:
        (1) polycaprolactones and copolymers thereof with polycarbonates, polytetrahydrofurans, polypropyleneglycol and polyethylene glycol; with
        (2) a member of the group consisting of polycarbonates, polytetrahydrofurans, polypropyleneglycol and polyethyleneglycol.

3. The thermoplastically processable polyurethane molding mass of claim 1, wherein 1,6-hexane diol is the chain lengthening agent.

4. The thermoplastically processable polyurethane molding mass of claim 2, wherein 1,6-hexane diol is the chain lengthening agent.

5. A surface material for a motor vehicle interior comprising the polyurethane according to claim 1.

6. A packaging for foods comprising the polyurethane according to claim 1.

7. A molded element, film or nonwoven material suitable for hygiene and medical purposes comprising the polyurethane according to claim 1.

8. A melt glue or adhesive mass suitable for textile applications comprising the polyurethane according to claim 1.

9. A method for producing a thermoplastically processable polyurethane molding mass, free of cyclic oligourethanes capable of migration, and demonstrating lightfastness, comprising the steps of: reacting one or more aliphatic polyols having a molecular weight of 450 to 4000 g/mol and an OH number of 20 to 235, selected from the group consisting of polycarbonates, polytetrahydrofurane, and copolymers thereof and mixtures of them, mixtures of either a polycarbonate or a polytetrahydrofurane with either a polyadipate or a polycaprolactone; and a mixture of: (1) polycaprolactones and copolymers thereof with polycarbonates, polytetrahydrofurans, polypropyleneglycol and polyethylene glycol; with (2) a member of the group consisting of polycarbonates, polytetrahydrofurans, polypropyleneglycol and polyethyleneglycol, with 1,6-hexamethylene diisocyanate and a chain lengthening agent selected from the group consisting of 1,5-pentane diol, 1,6-hexane diol, and 1,4-cyclohexane diol, with an equivalence ratio of the 1,6-hexamethylene diisocyanate to the polyol of 1.5:1 to 14.0:1, where the NCO characteristic number, formed from the quotient of the equivalence ratios of isocyanate groups to the sum of the hydroxyl groups of polyol and chain lengthening agent, multiplied by 100, lies in the range of 96 to 105, and wherein the polyol polycaprolactone is not used in combination with 1,6-hexanediol.

10. The method of claim 9, wherein the aliphatic polyols are selected from the group consisting of:

(a) polycarbonates;

(b) poltetrahydrofurans;

(c) combinations of a polycarbonate or a polytetrahydrofurane with either a polyadipate or a polycaprolactone;

(d) a mixture of:
   (1) Polycaprolactones and copolymers thereof with polycarbonates, polytetrahydrofurans, polypropyleneglycol and polyethyleneglycol;
   (2) A member of the group consisting of polycarbonates, polytetrahydrofurans, polypropyleneglycol and polyethylene glycol.

11. The method according to claim 9 wherein 1,6-hexane diol is the chain lengthening agent.

12. The method according to claim 10, wherein 1,6-hexane diol is the chain lengthening agent.

* * * * *